H. DOOLITTLE.
Potato-Digger.
No. 58,390.
Patented Oct. 2, 1866
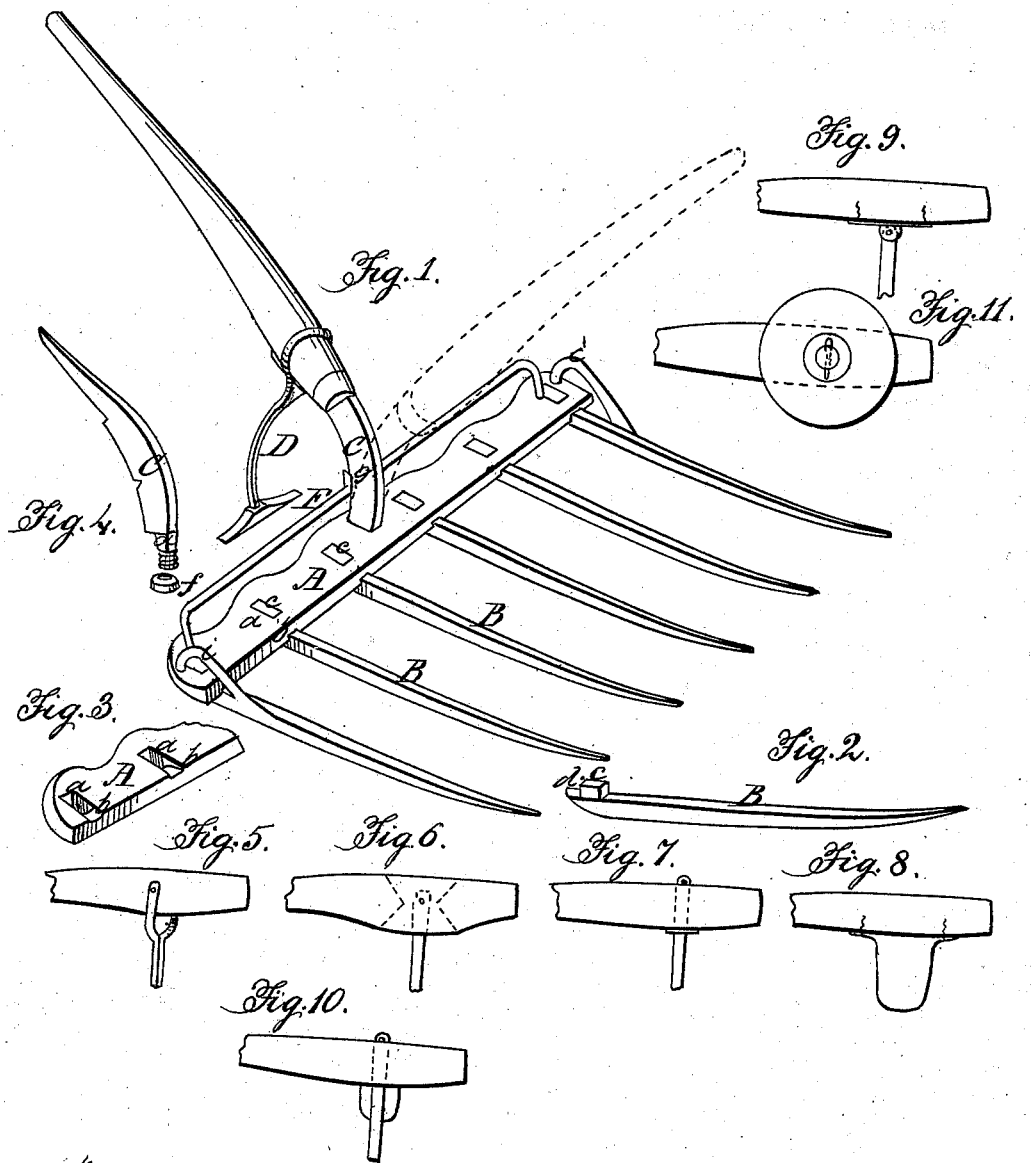
Witnesses:
Geo. M. Tibbitts
N. Orton
Inventor:
Harrison Doolittle

UNITED STATES PATENT OFFICE.

HARRISON DOOLITTLE, OF EAST CLEVELAND TOWNSHIP, CUYAHOGA COUNTY, OHIO.

IMPROVEMENT IN FORKS FOR DIGGING POTATOES.

Specification forming part of Letters Patent No. 58,390, dated October 2, 1866.

*To all whom it may concern:*

Be it known that I, HARRISON DOOLITTLE, of the township of East Cleveland, in the county of Cuyahoga, in the State of Ohio, have invented a new and Improved Mode of Constructing Potato-Forks; and I do hereby declare that the following is a full and exact description thereof, reference being had to the accompanying drawings, and to the letters of reference marked thereon, in which—

Figure 1 is a perspective view of the fork complete, the handle in dotted lines, showing its position when the fork is used as a rake. Fig. 2 is one of the tines detached. Fig. 3 is a portion of the cross-head, showing the under side with the mortises and countersinks for the reception of the tines. Fig. 4 is the shank detached. Figs. 5, 6, 7, 8, 9, 10, and 11 are sections, showing how the ――― may be attached.

The nature of my invention consists in the peculiar construction of its parts, it being capable of being employed in a great variety of uses. First, as a fork, it may be used for digging potatoes, handling manure or hay, or any of the uses in which a fork is employed; and, second, by turning the handle around, as seen by dotted lines in the accompanying drawings, it is immediately converted into a rake, which may be used for any of the purposes to which that implement is designed.

To enable others to make and use my invention, I will proceed to describe its construction and operation.

I construct a cross-head, A, which may be of cast or wrought iron, having mortises or apertures *a*, with a countersink, *b*, either round or square, in which I attach the tines B B. The tines are made either of round or square steel, and are provided with a round or square tenon, *c*, and a projection or shoulder, *d*. When the tines are attached they rest in the countersinks *b*, which serves to keep them firmly in place. I make the shank C with a square tenon, *e*, which may be secured in place in either position represented in Fig. 1 by means of a nut, *f*. I make an adjustable support or fulcrum, D, in any of the forms represented by Figs. 5, 6, 7, 8, 9, 10, or 11; but I prefer the one represented in Fig. 1, it being the most advantageous. It is used as a fulcrum, to obtain leverage in raising the fork out of the ground when used for digging potatoes, and it also facilitates in shaking out the loose dirt when thus used. I have also provided a rod, E, which rests in a notch, *g*, of the shank C, which serves as a guard to keep the potatoes from falling off when the fork is used for that purpose. There are also small guards *i i*, welded to each end of the cross-head A, for the same purpose.

By reversing the handle, as before mentioned, this fork is convertible into a rake, which may be used for raking up stones, brick, and chips of all sorts. It can also be attached to a cart or wagon, and serve as a rake to gather hay or straw, &c.

I claim—

1. Constructing the cross-head A, adapted to receive the tines, in the manner described.

2. The tine B, constructed as herein described, in combination with the cross-head.

3. The adjustable support or fulcrum D, in either of the forms represented, in combination with the handle and shank C.

4. The employment of the guard-rod E for the purpose herein specified.

5. Converting the fork into a rake in the manner herein described, and the combination of the fork and rake, for the purposes herein set forth.

HARRISON DOOLITTLE.

Witnesses:
 GEO. W. TIBBITTS,
 N. ORTON.